United States Patent [19]

Kuwagaki et al.

[11] 4,257,683
[45] Mar. 24, 1981

[54] ELECTROCHROMIC DISPLAY

[75] Inventors: Hiroshi Kuwagaki, Jyoyo; Hiroshi Hamada, Tenri; Sadatoshi Takechi, Tenri; Kohzo Yano, Tenri, all of Japan

[73] Assignee: Sharp Kabushiki Kaisha, Osaka, Japan

[21] Appl. No.: 5,682

[22] Filed: Jan. 23, 1979

[30] Foreign Application Priority Data

Jan. 24, 1978 [JP] Japan .................... 53-6956

[51] Int. Cl.³ ............................................. G02F 1/17
[52] U.S. Cl. ............................................. 350/357
[58] Field of Search ................................. 350/357

[56] References Cited

U.S. PATENT DOCUMENTS

| | | | |
|---|---|---|---|
| 3,968,639 | 7/1976 | Berets et al. | 350/357 |
| 4,076,386 | 2/1978 | Giglia | 350/357 |
| 4,167,309 | 9/1979 | Barclay et al. | 350/357 |

*Primary Examiner*—James W. Davie
*Attorney, Agent, or Firm*—Birch, Stewart, Kolasch & Birch

[57] ABSTRACT

An electrochromic display disclosed herein is compatible with diversification of information to be displayed. A background plate bears a stationary display pattern printed thereon. An electrochromic phenomenon takes place between a pair of electrodes in association with the stationary display pattern.

8 Claims, 11 Drawing Figures

ELECTROCHROMIC DISPLAY

BACKGROUND OF THE INVENTION

This invention relates to an electrochromic display (referred to as "ECD" hereinafter) which varies, reversibly, the degree of coloration or the transmission factor in response to a redox reaction occurring at or near the surfaces of electrodes in response to a voltage applied for displaying purposes, and more particularly, applied to a background plate for an ECD. An ECD utilizes the phenomenon which varies the light absorbency of an electrochromic material sandwiched between electrodes, that is, the so-called electrochromism. Well known electrochromic materials are viologen, $WO_3$, $MoO_3$, $TiO_2$, AgI, polytungsten anion, etc. Nowadays research activities have been mostly directed to a family of the solution type using viologen and a family of the solid state type using tungsten oxide ($WO_3$). The solution type of the ECD induces the coloring phonemenon by educing colored material on the surfaces of the electrodes from a solution, whereas the solid state type produces color centers having absorption within a visible light range in the solid state electrochromic material due to an electrochemical reaction.

One major feature of the ECD rests in that the ECD is of the passive type like liquid crystal displays and provide a high contrast and vivid display. In addition, enabling voltage is relatively small and less power is consumed because of the passive nature. It is further possible that a visual display may last for a long period of time with no sustain voltage applied because of the non-volatile memory properties inherent to the ECD. Other advantages of the ECD are that a wide display panel may be reduced to practice and so on. The ECD is applicable widely to segmented displays for use in digital timepieces, calculators, registers, etc., character, symbol or chart display panels with an X-Y matrix electrode assembly, light valves (projection type displays), light shutters, transmission light quantity regulators, etc. In view of the foregoing, the ECD represents a new promising display which provides a much more vivid display than liquid crystal displays, bears excellent appearance of a display background without polarizers, shows that the display performances are insensitive to changes in the viewing angle, consumes less power than light emitting diodes and avoids a degraded condition of display even within bright light surroundings. With a wider range of applications, it is desirable to provide the ECD with diversification of display patterns.

It is therefore an object of the present invention to provide a new and useful ECD which is fully compatible with varied display patterns without impairing the above listed advantages of the ECD.

Other objects and many of the attendant advantages of the present invention will be readily appreciated as the same becomes better understood by reference to the following detailed description which is to be considered in conjunction with the accompanying drawings.

DETAILED DESCRIPTION OF THE INVENTION

Figure 1:
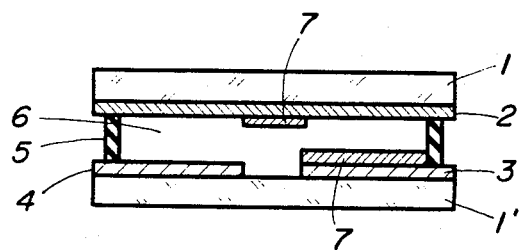
FIG. 1 is a cross sectional view of a basic ECD structure.

Referring now to FIG. 1, there is shown an example of an ECD cell for illustration of the basic structure and operating principle thereof only. FIG. 1 shows the ECD containing tungsten oxide ($WO_3$) as electrochromic material. A front glass support 1 and a back glass support 1' are juxtaposed at a very small distance in the opposing relationship with the former bearing one or more display electrodes 2 at the facing surface thereof and the latter bearing a counter electrode 3 and a reference electrode 4 at the facing surface thereof. The two supports 1—1' are sealed together at the periphery via a spacer 5 to complete a display cell. An electrolyte 6 is injected inside the display cell, which may contain cellosolve acetate and $LiClO_4$ and preferably an addition of $BaSO_4$ to provide a good white background. A thin film of the electrochromic material 7 (for example, $WO_3$) is deposited on the display electrode 2 and the counter electrode 3.

The ECD with the above mentioned structure will operate in the following matter. A flow of current from the counter 3 to the display electrode 2 encourages the reaction as defined by the following formula as the coloring mechanism, thereby coloring the display electrode 2 on which the $WO_3$ thin film 7 is deposited:

$$xM^+ + WO_3 + xe^- \rightarrow M_xWO_3 \tag{1}$$

wherein M is hydrogen or metal.

It is believed that both positive ions and electrons are injected into the $WO_3$ thin film 7 to produce tungsten bronze contributive to the coloring phenomenon.

On the other hand, when current flows from the display electrode 2 to the counter electrode 3 as opposed to above to initiate the bleaching phenomenon, the display electrode 2 is bleached by a reaction reverse to the formula (1). In this way, the ECD performs a display operation by reversibly repeating the reaction as defined in (1).

The reference electrode 4 senses a potential difference with respect to the display electrode 2. A feedback circuit (not shown) is adapted to apply a voltage to the display electrode 2 in a manner to reduce the potential difference between the reference electrode 4 and the display electrode 2, prolonging life of the display cell. In the event that too high a voltage is applied to color the display electrode 2, objectional reactions will result, such as electrolysis other than those as defined in (1) to shorten life of the display cell. In addition, if voltage keeps being applied after the colored material on the display electrode 2 has been completely bleached, then undesirable reactions will happen to deteriorate the reversibility of the above discussed reactions.

The reference electrode 4 prevents those undesirable reactions from happening in advance.

Figure 2:
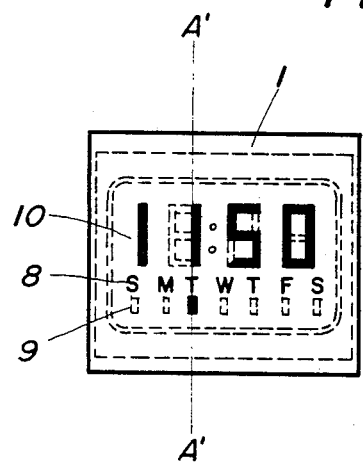
FIG. 2 is a front view of one preferred embodiment of an ECD cell of the present invention used with a wristwatch.
Figure 3:
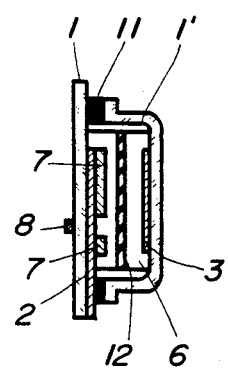
FIG. 3 is a cross sectional view taken along the line A—A of FIG. 2.
Figure 4:
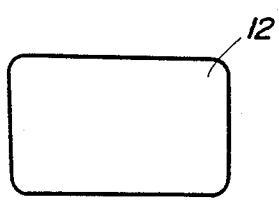
FIG. 4 is a plane view of a porous ceramic plate used with the ECD cell of FIG. 2.

To provide the ECD having the above discussed advantageous feature with diversification of information to be displayed, it is necessary for various display patterns such as characters, numerals, gradations, charts to be included within the ECD cell per se. By way of example, FIG. 2 shows a display region of a wristwatch ECD cell of the present invention, FIG. 3 shows the same in a cross sectional view, and FIG. 4 shows a porous ceramic plate used with the wristwatch ECD cell of FIG. 2. The wristwatch ECD cell of FIG. 2 displays not only hours and minutes but also days of the week. To this end, on the transparent glass support 1 there is provided characters 8 indicative of days of the week by a well known printing method such as tamp printing and screen printing. The calender display is executed by a combination of these printed characters 8 and a selected one of a plurality of display electrodes 9 corresponding to the calender characters, the selected one of the display electrodes 9 serving as a visual indicator to a day of the week. In the illustrative example of FIG. 2, tuesday is visually displayed by the printed character 8 and the selectively activable display electrode 9. A numerical display region 10 of FIG. 10 effects displaying of hours and minutes through a conventional segment electrode assembly. As seen from FIG. 3 with respect to the ECD cell structure, the the front glass support 1 and the back support 1' are bonded with each other via adhesive 11 and the cavity defined by the pair of the supports is filled with the electrolyte 6. The front support 1 bears at the facing surface the one or more display electrodes 2 of indium oxide ($In_2O_3$) in a thin film and the tungsten oxide thin film 7 as the electrochromic material for executing optical selection of hours, minutes and days of the week. The back support 1 bears at the facing surface the counter electrode 3. The porous ceramic plate 12 of FIG. 4 is interposed between the display electrode 2 and the counter electrode 3. As stated above, the front support 1 bears the calender displaying characters 8 at the other or outer surface. It will be apparent from FIG. 3 that the calender displaying characters 8 are spaced the thickness of the front support 1 (say, 0.7–1.5 mm) away from the display electrode 2 with the result of a level difference therebetween. Disadvantageously, such a level difference affects the independency of the display performances of the ECD cell with changes in viewing angle.

Figure 5:
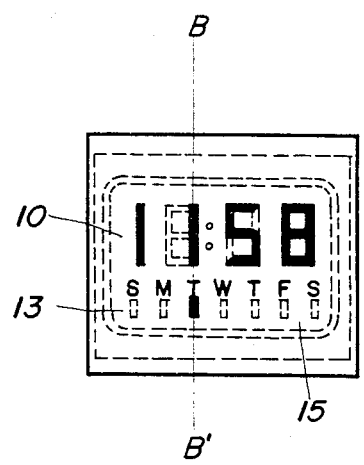
FIG. 5 is a front view of another preferred embodiment of an ECD cell of the present invention for use in a wristwatch.
Figure 6:
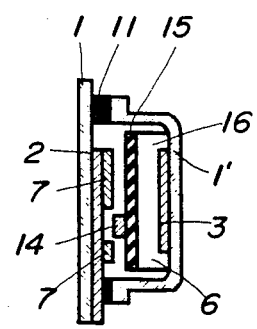
FIG. 6 is a cross sectional view taken along the line B—B of FIG. 5.
Figure 7:
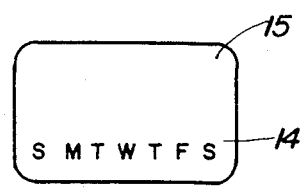
FIG. 7 is a plane view of details of a porous ceramic plate used with the ECD cell of FIG. 5.

FIG. 5 shows a front view of another preferred embodiment of a wristwatch ECD cell of the present invention. FIG. 6 is a cross sectional view taken along the line B—B of FIG. 5 and FIG. 7 is a plane view of details of a porous ceramic plate useful with the ECD cell of FIG. 5.

In FIG. 5, the display also consists of the segment type numerical display section 10 for displaying hours and minutes and the calender display section 13 for displaying a day of the week by selectively coloring electrodes. As best seen from FIG. 6, the ECD cell structure comprises the front glass support 1 and the dishlike back support 1' bonded together at the periphery through adhesive 11 to form an envelope of the display cell. On the facing surface of the front glass support 1 there are stacked the optically transparent display electrode 2 of indium oxide, tin oxide, etc., and the thin film 7 of the electrochromic material, e.g., tungsten oxide for visually displaying hours and minutes in a conventional segmented font and providing a visual indicator to a day of the week. The back support 1' carries the counter electrode 3 at the facing surface thereof. Moreover, between the display electrode 2 and the counter electrode 3 there are the porous ceramic plate 15 containing principally alumina $Al_2O_3$ and bearing characters 14 for days of the week printed thereon, and a filter 16 made of glass, cellulose or synthetic fiber and impregnated with the electrolyte 6. The envelope is filled with the electrolyte 6.

To print the characters on the porous ceramic plate 15 for calender displaying, the color base of which the principle ingredient is chrome oxide and kaolin are sintered at a temperature of 1100° C. and then finely powdered for mixture with a flux consisting of lead borosilicate glass. Subsequently, the resulting paste is printed in desired positions on the porous ceramic plate 15 by well known screen printing and then fired at a temperature of 800°–1000° C. The result is that the calender displaying characters 14 are formed in green on the porous ceramic plate 15 as viewed from FIG. 7. A level difference between the calender displaying characters 14 and the display electrode 2 is selected as low as possible for the above discussed reason.

Figure 8:
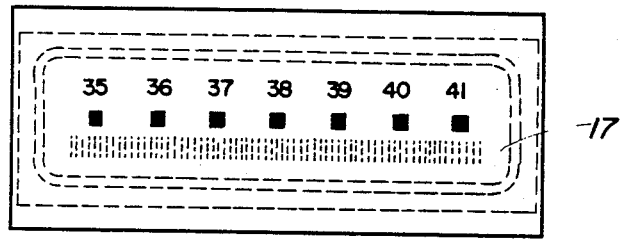
FIG. 8 is a front view of still another preferred embodiment of the ECD cell of the present invention for use in a thermometer.
Figure 9:
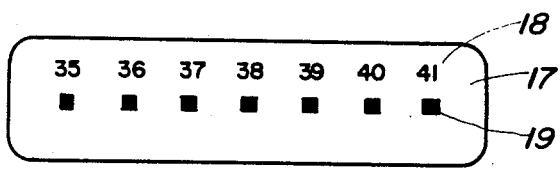
FIG. 9 is a plane view of a porous ceramic plate used with the ECD cell of FIG. 8.

FIG. 8 shows in a front view another embodiment of the present invention wherein the ECD cell is applied to a clinical thermometer, and FIG. 9 shows in a front view a porous ceramic plate used with the ECD cell of FIG. 8. Characters 18 concerning temperatures and graduations 19 in unit of 1° C. are printed on the porous ceramic plate 17. For example, the characters 18 are printed in green and the graduations 19 up to 36° C. in blue and the graduations 19 more than 36° C. in red.

It will be noted that the numerals, characters, etc., on the porous ceramic plate may be printed in various colors by changing the kind of the metal oxide which is the principle ingredient of the color base. In other words, yellow is available by oxides of antimony, red is available by mixtures of gun metal, selenium oxide and ferrous oxide, blue is available by cobalt oxides, purple is available by mixtures of gun metal and cobalt oxide and so on.

Figure 10:
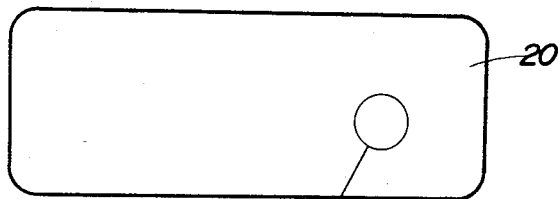
FIG. 10 is a plane view of another preferred form of a porous ceramic plate of the present invention.
Figure 11:
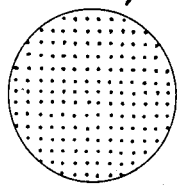
FIG. 11 is a partly enlarged diagram of FIG. 10.

FIG. 10 shows a plane view of a porous ceramic plate colored by means of a multiplicity of colored dots and FIG. 11 shows an enlarged diagram of FIG. 10. By forming the multiplicity of the colored dots throughout the porous ceramic plate 20, the ceramic plate 20 may be uniformly colored without damaging the porosity of the ceramic plate.

As noted earlier, the present invention takes advantage of all the meritorious features of the ECD which is free of the viewing angle dependency as experienced with LCDs. According to the teachings of the present invention, a visual display is carried through by the printed or stationary display patterns such as characters, numerals, gradations, and charts and the electrochromic phenomenon taking place between the pair of the electrodes associated with the stationary display patterns. In the preferred embodiment of the present invention, the level difference is reduced to a minimum between the display characters printed on the ceramic plate and the selectively coloring region of the display electrode by a proper selection of the spacing between the porous ceramic plate and the display electrode. Since the characters, symbols, etc. are printed on the porous ceramic plate secured within the cell envelope, there is no likelihood that those characters, symbols, etc. become faded due to wear, damage, etc. caused by external stress. This makes it possible to achieve the well-defined and stable display performances for a long period of time. In addition, since the ECD cell of the present invention is easy to manufacture and employs the ceramic plate as the background plate, a protective cover is not needed for the display cell with the resulting reduction of the number of components. To be brief, the ECD cell of the present invention is fully compatible with diversification of display patterns, modes and layouts.

The invention being thus described, it will be obvious that the same may be varied in many ways. Such modifications are not to be regarded as a departure from the spirit and scope of the invention, and all such modifications are intended to be included within the scope of the following claims.

I claim:

1. An electrochromic display capable of forming a display image thereon, comprising:
   a pair of opposing electrodes;
   electrochromic material interposed between said pair of opposing electrodes, manifesting an electrochromic phenomenon when a voltage is applied thereto; and
   a display pattern member disposed between said pair of opposing electrodes, said display pattern member having a display pattern printed thereon, wherein the electrochromic phenomenon takes place in association with said display pattern on said display pattern member to form said display image.

2. The electrochromic display according to claim 1, wherein said display pattern member comprises a support means for supporting one of said pair of opposing electrodes.

3. The electrochromic display according to claim 1, wherein said display pattern member comprises a porous ceramic plate disposed between said pair of opposing electrodes.

4. An electrochromic display capable of forming a display image thereon, comprising:
   a plurality of selectively operable display electrode means;
   a common electrode means opposed to said display electrode means;
   electrochromic material interposed between said display electrode means and said common electrode means thereby manifesting an electrochromic phenomenon; and
   a display pattern member disposed between said display electrode means and said common electrode means, said display pattern member having a display pattern printed thereon, wherein the electrochromic phenomenon takes place in association with said display pattern on said display pattern member to form said display image, and wherein said display image is formed by visually combining selected ones of said display electrodes manifesting said electrochromic phenomenon with the display pattern on said display pattern member.

5. An electrochromic display capable of forming a display image thereon, comprising:
   a first electrode means;
   a second electrode means disposed opposite to said first electrode means;
   electrochromic material disposed between said first and second electrode means and manifesting an electrochromic phenomenon when a voltage is applied between said first and second electrode means; and
   background plate means disposed between said first and second electrode means and having a display pattern disposed thereon, the electrochromic phenomenon taking place in association with the display pattern on said background plate means to form said display image on said electrochromic display.

6. The electrochromic display according to claim 5, wherein said background plate means comprises a porous ceramic plate, and said display pattern on said background plate is printed in a particular color.

7. The electrochromic display according to claim 5, wherein said background plate comprises a support means for supporting one of said first and second electrode means.

8. The electrochromic display according to claim 5, wherein the display pattern on said background plate means is spaced at a minimum distance from the inner surface of said first electrode means.

* * * * *